United States Patent [19]

Clark, Jr.

[11] Patent Number: 4,638,121
[45] Date of Patent: Jan. 20, 1987

[54] TELEPHONE PAY STATION

[75] Inventor: Robert A. Clark, Jr., Ft. Lauderdale, Fla.

[73] Assignee: Communications Equipment and Engineering Co., Plantation, Fla.

[21] Appl. No.: 753,534

[22] Filed: Jul. 10, 1985

[51] Int. Cl.⁴ .......................................... H04M 17/02
[52] U.S. Cl. .................................... 379/145; 194/205; 379/36; 379/155
[58] Field of Search ............ 179/6.3 R, 6.31, 6.3 MA, 179/18 DA, 90 D; 194/282, 312

[56] References Cited

U.S. PATENT DOCUMENTS

| | | | |
|---|---|---|---|
| 3,757,055 | 9/1973 | McCann et al. | 179/90 D |
| 3,786,196 | 1/1974 | Gresham | 179/18 DA |
| 3,794,770 | 2/1974 | Tabiichi et al. | 179/63 R |
| 3,804,984 | 4/1974 | Yachabach | 179/6.3 R |
| 3,992,588 | 11/1976 | Hunsicker | 179/6.3 R |
| 4,234,764 | 11/1980 | Beere | 179/90 D |
| 4,243,841 | 1/1981 | Young | 179/6.3 R |
| 4,425,480 | 1/1984 | Lischin | 179/90 D |
| 4,436,196 | 3/1984 | Crisp et al. | 194/100 A |

Primary Examiner—Robert G. Lev
Attorney, Agent, or Firm—Mason, Kolehmainen, Rathburn & Wyss

[57] ABSTRACT

A coin receiving prepay telephone station for local calls includes a telephone receiver and transmitter with a handset and a supporting hook switch cradle therefor. The station further includes a coin chute having an open end for receiving a coin and a lower end for discharging coins into a coin box. A solenoid controlled arm is movable transversely into and out of the coin chute adjacent a level near the open end for normally retaining a coin deposited in the chute in a partially exposed retrievable position permitting manual extraction from the chute if a call dialed from the station is not answered. Circuitry is provided for activating the solenoid controlled arm to move out of the coin chute permitting the coin previously retained therein to drop into the coin box when a called party answers a call of over three digits dialed at the station.

12 Claims, 4 Drawing Figures

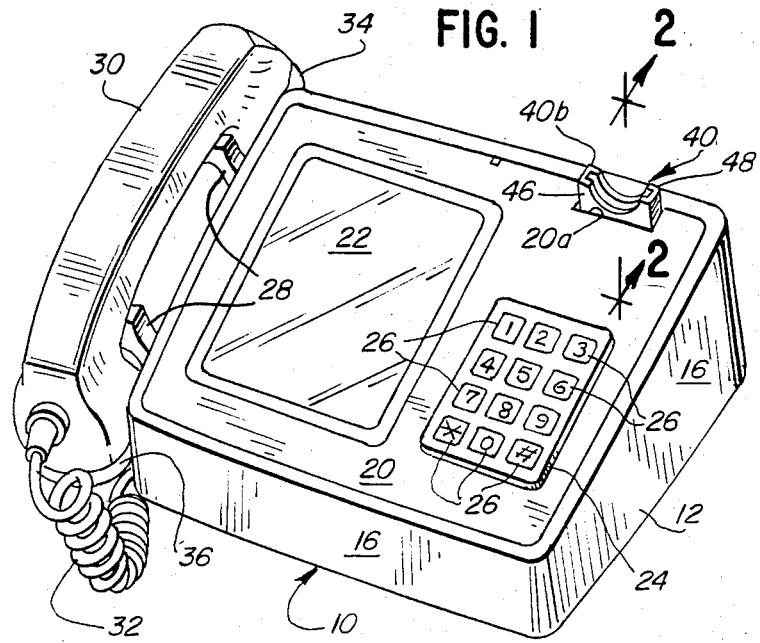
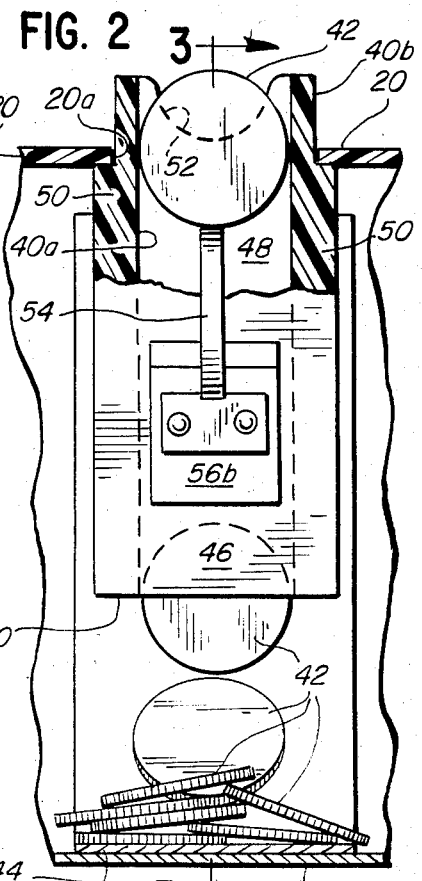
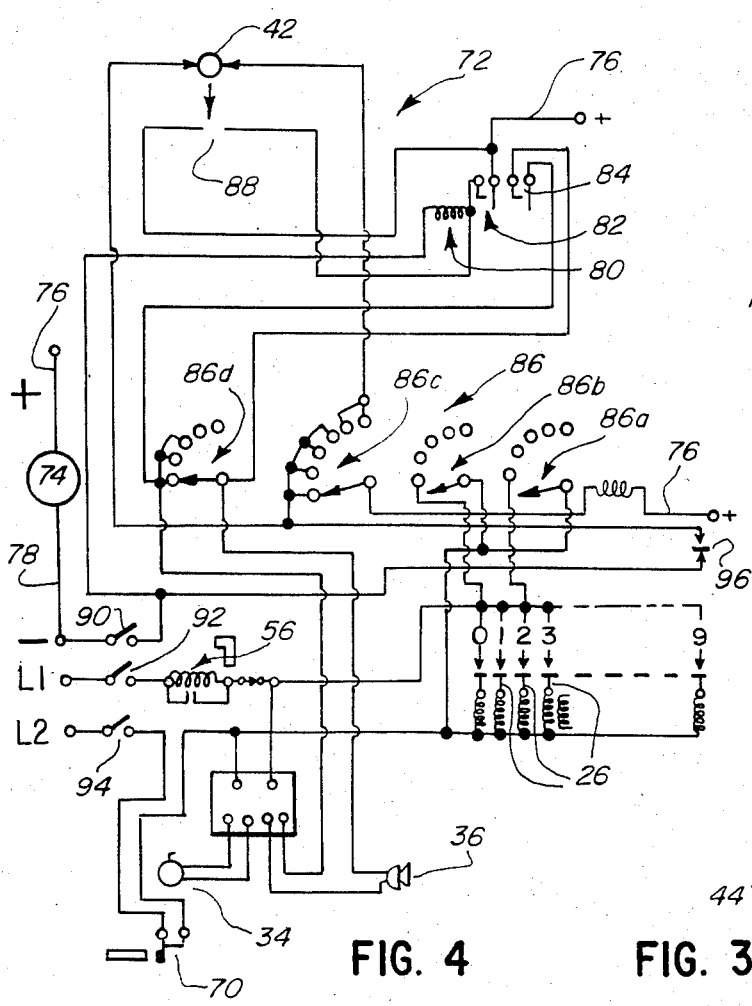
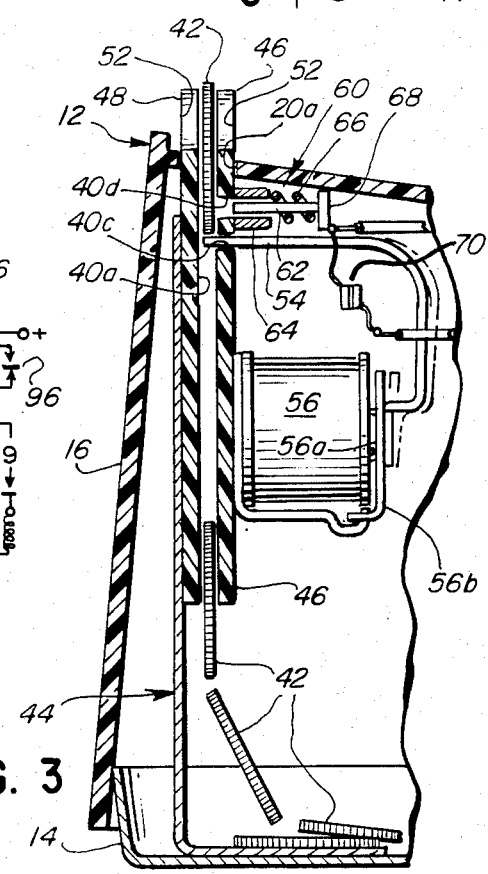

TELEPHONE PAY STATION

BACKGROUND OF THE INVENTION

1. Field of the Invention

The present invention relates to a new and improved prepay telephone station and, more particularly, to a coin receiving prepay telephone station for local calls. The local call pay telephone in accordance with the present invention is particularly well-suited for semi-restricted locations where vandalism is not a serious problem. The telephone is particularly designed to accept local calls, only and calls beginning with the digits "0" 0 and/or "1" will be locked out. However, three digit calls, such as "911" and "411", will be passed even without the insertion of a coin. The local call prepay telephone station of the present invention is designed to accept quarters only and is provided with a slug detector for detecting magnetic slugs placed in the coin chute.

2. Description of the Prior Art

A variety of telephone pay stations have been developed and U.S. Pat. No. 4,136,262, issued Jan. 23, 1979, discloses a telephone pay station providing high security and full prepay functions. An automatic call timing telephone apparatus is disclosed in U.S. Pat. No. 4,198,545, issued Apr. 15, 1980.

OBJECTS OF THE PRESENT INVENTION

It is an object of the present invention to provide a new and improved local call, pay telephone station and more particularly a new and improved pay telephone station designed for semi-restricted locations where vandalism is not a serious problem.

Another object of the present invention is to provide a new and improved, pay telephone station wherein only local calls will be accepted and more particularly to provide a fully prepaid telephone station wherein calls commencing with the digit "0" and/or "1" will be locked out.

Still another object of the present invention is to provide a new and improved pay telephone station of the character described wherein three digit calls such as "911" for emergency assistance and/or "411" for directory assistance will be passed without requiring the insertion of a coin.

Yet another object of the present invention is to provide a new and improved pay telephone station which will accept quarters and more particularly a local call pay telephone station which will accept only coins of one size or denomination.

Yet another object of the present invention is to provide a new and improved local call pay telephone station with means for detecting magnetic slugs.

Another object of the present invention is to provide a new and improved local call, pay telephone station which is relatively low in cost, simple in operation, neat in appearance and reliable in operation.

BRIEF SUMMARY OF THE INVENTION

The foregoing and other objects and advantages of the present invention are accomplished in a new and improved, coin receiving, prepay telephone station for local calls which includes a telephone receiver and transmitter with a handset and a supporting hook switch cradle therefor. The telephone station is provided with a coin chute having an open end for receiving a coin and a lower end for discharging coins into a coin box. A solenoid control arm is movable transversely into the coin chute at a level adjacent the open end for retaining a deposited coin in the chute in a partially exposed manually retrievable position. Circuit means is provided for activating the solenoid control arm to move into the coin chute when the hand set is lifted off the cradle and thereafter to withdraw the arm for permitting the deposited coin previously retained therein to drop into the coin box when a called party answers a call that is over three digits when dialed at the pay station. The circuit of the telephone station is designed to pass calls of three digits such as "911" or "411" without requiring the deposit of a coin and to reject calls that are not local, such as those commencing with the digits "0" or "1".

In operation, a coin is inserted into a coin chute and retained in a manually retrievable position in the coin chute before more than three digits can be dialed. When a called party answers on a local call, the coin is then released to drop down into the coin box and the calling party can begin talk. The pay station includes a magnetic slug detector which is operative to result in the discharge of the slug into the coin box without permitting a call to be made. In the event a local call is initiated at the station and the party being called does not answer the call, the coin previously deposited in the chute can be manually retrieved from the chute. When the handset is replaced on the hook switch cradle the pay station is conditioned ready to accept another call.

BRIEF DESCRIPTION OF THE DRAWING

For a better understanding of the present invention, reference should be had to the following detailed description taken in conjunction with the drawing, in which:

FIG. 1 is a perspective, elevational view of a new and improved local call, prepay telephone station constructed in accordance with the features of the present invention and showing the dialing face and an upper portion of the coin chute thereof;

FIG. 2 is a fragmentary cross-sectional view of the coin chute of the pay station taken substantially along line 2—2 of FIG. 1;

FIG. 3 is a fragmentary cross-sectional view taken substantially along lines 3—3 of FIG. 2; and FIG. 4 is an electrical schematic diagram of a control circuit of the telephone pay station in accordance with the present invention.

DETAILED DECRIPTION OF THE PREFERRED EMBODIMENT

Referring now to the drawing, more particularly to FIG. 1, a new and improved coin receiving fully prepay telephone station for local calls is illustrated, indicated generally by the reference numeral 10 and constructed in accordance with the features of the present invention. The telephone station 10 includes a housing 12 preferably formed of molded plastic material which includes a removable bottom structure 14 (FIGS. 2 and 3) and a peripheral side wall 16 joined around the inner upper edge thereof to a generally rectangular dialing face 20 or upper wall 20.

The dialing face includes a rectangular window section 22 of relatively large size for containing an instruction sheet for convenient viewing by a person operating the telephone pay station. In addition, a dialing frame or key pad 24 having a plurality of individually activated pushbutton keys 26 thereon arranged in an array of columns and rows and appropriately labeled as shown is provided to function as dialing keys for the user. The pay station also includes a hook switch cradle structure 28 on one side of the housing 16 for supporting a handset 30 electrically connected with the circuitry of the pay station in the housing 16 through a flexible elongated cord 32.

The handset includes a speaker or headphone 34 at an upper end and a transmitter or microphone 36 at a lower end to provide means for two-way conversations between a party using the pay station and a party at the other end of the line being called.

In accordance with the present invention, the telephone pay station 10 includes an elongated, upstanding coin chute 40 preferably formed of molded plastic material and having an elongated axial passage 40a therein dimensioned to permit coins 42 of one particular size such as a quarter to pass downwardly through the chute for discharge into a coin box 44 therebelow supported and enclosed within the station housing 12. The coin chute 40 includes a pair of parallel, front and rear walls 46 and 48 having relatively wide, flat inside faces defining a smooth surface of the passage 40a and the front and back wall are integrally joined together with a pair of relatively narrow opposite edge walls 50 having narrow inside faces at right angle to the inside faces of the front and back walls of the coin chute.

The coin passage 40a is open at the lower end and an upper end portion 40b of the chute projects upwardly beyond the level of the upper surface of the housing top panel 20 for permitting direct access to the upper end of the coin chute from the exterior of the housing 16. A rectangular slot 20a is provided along the upper edge of the top panel 20 in order to accommodate the upwardly projecting upper end portion 40b of the coin chute 40.

In order to facilitate manual insertion of a coin 42 into the upper end of the passage 40a and to facilitates the manual withdrawal of a coin retained in an upper position as shown in FIGS. 2 and 3, the front and back walls 46 and 48 are formed with semicircular shaped recesses 52 at the upper edges for permitting the fingers to conveniently grasp the opposite sides of a coin while retained in position at the upper end of the passage as shown in FIGS. 2 and 3.

When a call is being made, the hand set 30 is lifted off the hook switch cradle 28 and this causes a solenoid 56 to be energized to move the tip of a coin retaining arm 54 into a coin retaining position extending transversely across the coin chute 40 at a level such that an upper portion of a deposited coin 42 is exposed for manual retrieval should the call not be completed. After the hand set is picked up, a coin 42 is inserted into the upper end of the coin passage 40a to initiate a call, the coin 42 is normally retained in the manually retrievable position by the tip or end portion of a retaining arm 54 which projects transversely across the coin passage to engage the lower periphery of the coin and prevent the coin from dropping further down the chute. If the call is dialed and the party called does not answer the call, the arm 54 is retained in the position shown so that the coin 42 can be manually retrieved from the chute 40 until the hand set 30 is replaced on the switch cradle 28. The arm 54 is controlled by the solenoid coil 56 so that the tip end will move from a retracted or exterior position into the coin chute transversely thereof to prevent the coin from dropping downwardly into the coin box 44 until the party called has answered. The tip end portion of the arm is movable into the passage 40a through a slot 40c provided in the front wall 46 and the slot 40c is formed at the appropriate level so that an upper portion of the coin retained by the tip of the arm is readily accessible from exteriorly of the housing for withdrawal from the coin chute. When the solenoid coil 56 is not energized, a magnetic core 56a thereof does not attract a movable armature 56b to which the arm 54 is connected and normally the arm remains in the retracted position (dotted lines) until energization of the solenoid 56 causes the armature 56b to pivot counterclockwise away toward the face of the core 56a to inject the tip of the arm into a blocking position in the coin passage 40a.

In accordance with an important feature of the present invention, the telephone station 10 includes a slug detecting mechanism 60 (FIG. 3) which includes a rod element 62 formed of high magnetic strength material such as Anico V. The rod element is mounted for sliding movement in a sleeve 64 on the front wall 46 of the coin chute at a level above the opening 40c. The rod element is biased outwardly in a direction transverse to the passage 40a by a coil spring 66 engaged between an outer end of the sleeve and a head element 68 on the outer end of the rod. The sleeve bore is aligned with an opening 40d provided in the front wall 46 of the coin chute 40 so that the inner end of the element can be readily attracted to move into close proximity to a slug of magnetic material when such is illegally placed in the coin slot instead of an actual coin. When a slug of magnetic material is placed into the chute during an attempt to make an illegal call, the slug is also retained in the manually retrievable position as shown in FIG. 3 but the highly magnetic rod element 62 is attracted inwardly against the force of the compression spring 66 and this causes a pair of normally closed switch contacts 70 to open and de-energize the solenoid 56 to retract the arm 54 out of the coin passage 40a thus permitting the slug to drop downwardly into the coin box. When this occurs it is not possible for a person inserting the slug into the pay telephone station 10 to continue dialing or completing a call.

Referring now to FIG. 4, there is shown an electrical schematic diagram of a control circuit that can be employed in the prepay telephone station 10 according to the present invention and that is designated generally by the reference character 72. The control circuit 72 is illustrated generally using electramagentic relays so that the operation thereof may be readily understood; however, the hardware embodiment of the present invention advantageously may be implemented in a digital logic circuit which could be fabricated in a single custom large-scale integrated circuit. Identical reference characters as used hereinbefore with respect to FIGS. 1–3 are employed hereinafter to describe identical components of the control circuit 72.

The control circuit 72 includes a D.C. power supply 74, for example, a battery, having a positive supply line 76 and a negative or neutral supply line 78. The control circuit 72 further includes a coin controlled relay 80 having a pair of contacts 82, 84; a stepping switch 86; a coin activated contact 88; a plurality of hook switches 90, 92, 94; and the above-described solenoid 56 and the slug detector switch contacts 70.

One end of the coin controlled relay coil 80 is coupled to the negative power supply line 78 via the normally open switch hook 90. The opposite end of the coin controlled relay coil 80 is coupled through the coin activated contacts 88 to the positive supply voltage line 76. The hook switches 90, 92, 94 are normally open and close when the handset 30 is removed from the switch hook cradle 28. The coin controlled relay 80 is energized by the deposit of a coin 42 into the coin chute 40 with the handset 30 removed from the switch hook cradle 28. The coin controlled relay contacts 82, 84 are provided normally open and are closed when the coin control relay 80 is energized. The relay contacts 82 couple the coin controlled relay coil 80 to the positive supply voltage line 76 and thus retain the coin controlled relay 80 energized until the hand set 30 is replaced on the hook switch cradle 28 and the hook switch 90 returns to the normally open position.

The stepping switch 86 is coupled to the multifrequency tone key switches 26 via a tone activated contact 96 that closes each time any of the 12 keys 26 is pushed in or activated. The stepping switch 86 includes contacts 86a, 86b, 86c, 86d that are arranged as shown. The contacts 86a and 86b are coupled to the "0" and "1" key switches 26 so that when the "0" or "1" key switch 26 is the first key that is activated, the contacts 86a and 86b advances to short circuit the oscillator output of the "0" and "1" key switches to the solenoid 56, whereby the coin 42 is collected. The stepping switch contacts 86c is arranged to enable three digit calls, such as 911 for emergency assistance, to be passed from the multifrequency tone generator set by the operation of the key switches 26 and pass the three digit tones through the lines L1 and L2 to the central telephone office. The stepping switch contacts 86d is coupled to the coin controlled relay contacts 84 to enable passing dial tones from the keys 26 to the local telephone central office when a coin 42 has been deposited in the coin chute 40.

When the called party answers, the coin is collected through the application of a positive battery voltage to the line L1 by the central office. However, if the called party does not answer, the user can manually retrieve the coin 42 from the chute 40.

When a magnetic slug is inserted into the chute 40, the slug detector switch contacts 70 are caused to open and thereby deenergize the solenoid 56. Thereby permitting the slug to drop downwardly into the coin box 44.

When the hand set 30 is positioned on the hook cradle 28, the hook switches 90, 92 and 94 are returned to the normally open position. The power supply 74 is disconnected from the relays within the control circuit 72 with the hook switches 90, 92 and 94 provided in the normally open position and the prepay telephone station 10 is initialized.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A coin receiving telephone station for local calls only includes a telephone receiver and transmitter with a handset and a supporting hook switch cradle therefor comprising:

a coin chute having an open end for receiving a coin and a lower end for discharging coins into a coin box;

solenoid controlled arm means movable into said coin chute adjacent said open end for retaining a coin deposited in said chute in a partially exposed retrievable position permitting manual retraction from said chute; and circuit means for activating said solenoid controlled arm means to move out of said coin chute for permitting a coin previously retained therein to drop into said coin box when a called party answers a call over three digits dialed at said station.

2. The coin receiving telephone station of claim 1, including:

a housing having an outer wall and enclosing said coin box, said coin chute mounted in said housing with said lower end positioned to discharge coins moving downwardly through said chute into said coin box;

said open end of said chute positioned to be in communication with the exterior of said housing for receiving coins manually placed therein; and said arm means normally projecting into said coin chute at a level to engage a lower portion of a coin inserted into the open end of said chute and support said coin at an elevation therein wherein an upper portion of said coin is exposed above said chute for manual retrieval until said arm means is retracted permitting said coin to drop into said coin box.

3. The coin receiving telephone station of claim 2, wherein;

said coin chute includes an upper end portion extending outwardly of said outer wall of said housing and comprising a pair of opposite, parallel side walls and a pair of narrow opposite edge walls transverse thereto, said opposite side walls having cut away portions at the upper end of facilitating manual retrieval of a coin while retained in said retrievable position therein by said arm means projecting into said chute.

4. The coin receiving telephone station of claim 1, including;

slug detector means activated by the placement of a slug in said retrievable position in said coin chute for retracting said arm means to permit said slug to drop into said coin box.

5. The coin receiving telephone station of claim 4, wherein;

said slug detector means comprises a magnetic element attracted to move from a first position to a second position by the presence of a magnetic slug in said retrievable position in said coin chute, and switch means responsive to the movement of said magnetic element toward said second position for activating said arm means to retract from said coin chute permitting said slug to drop into said coin box.

6. The coin receiving telephone station of claim 5, wherein;

said slug detector means includes means biasing said magnetic element toward said first position.

7. The coin receiving telephone station of claim 1, wherein;

said circuit means includes circuitry permitting a called party to answer a call made from said station by dialing only three digits.

8. The coin receiving telephone station of claim 1, including;

biasing means normally urging said arm means into said coin chute, and wherein said solenoid of said solenoid controlled arm means is activated to move said arm means out of said coin chute in response to the answer of a called party.

9. The coin receiving telephone station of claim 8, wherein;
said solenoid is deactivated to permit said arm means to return to said position extending into said coin chute when said called party hangs up.

10. The coin receiving telephone station of claim 8, wherein;
said solenoid is deactivated to permit said arm means to return to said position extending into said coin chute when said handset is returned to be supported on said hook switch cradle of said station.

11. The coin receiving telephone station of claim 1, wherein;
said circuit means is inoperative to activate said solenoid controlled arm means to move out of said coin chute when a call over three digits is dialed beginning with the digit "0".

12. The coin receiving telephone station of claim 1, wherein;
said circuit means is inoperative to activate said solenoid controlled arm means to move out of said coin chute when a call over three digits is dialed beginning with the digit "1".

* * * * *